US008626550B2

(12) United States Patent
Marston

(10) Patent No.: US 8,626,550 B2
(45) Date of Patent: Jan. 7, 2014

(54) SCHEDULING SUBSIDIARY MEETING LOCATIONS

(75) Inventor: David Marston, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 1771 days.

(21) Appl. No.: 11/094,851

(22) Filed: Mar. 31, 2005

(65) Prior Publication Data

US 2006/0224969 A1 Oct. 5, 2006

(51) Int. Cl.
*G06Q 10/00* (2012.01)

(52) U.S. Cl.
USPC ........ 705/7.19; 705/7.16; 705/7.17; 705/7.18

(58) Field of Classification Search
USPC ........................................ 705/7.11–7.42; 1/1
See application file for complete search history.

(56) References Cited

U.S. PATENT DOCUMENTS

| | | | | | |
|---|---|---|---|---|---|
| 5,790,974 | A | * | 8/1998 | Tognazzini | 455/456.5 |
| 5,870,744 | A | * | 2/1999 | Sprague | 709/229 |
| 5,963,913 | A | * | 10/1999 | Henneuse et al. | 705/7.13 |
| 5,999,208 | A | * | 12/1999 | McNerney et al. | 348/14.08 |
| 6,016,478 | A | * | 1/2000 | Zhang et al. | 705/7.19 |
| 6,101,480 | A | * | 8/2000 | Conmy et al. | 705/7.18 |
| 6,167,379 | A | * | 12/2000 | Dean et al. | 705/7.18 |
| 6,363,352 | B1 | * | 3/2002 | Dailey et al. | 705/7.19 |
| 6,480,885 | B1 | * | 11/2002 | Olivier | 709/207 |
| 6,798,753 | B1 | * | 9/2004 | Doganata et al. | 370/260 |
| 6,865,538 | B2 | * | 3/2005 | Chithambaram et al. | 705/1.1 |
| 7,027,995 | B2 | * | 4/2006 | Kaufman et al. | 705/7.12 |
| 7,058,507 | B2 | * | 6/2006 | Saiki | 701/410 |
| 7,082,402 | B2 | * | 7/2006 | Conmy et al. | 705/7.19 |
| 7,108,173 | B1 | * | 9/2006 | Wang et al. | 235/377 |
| 7,236,976 | B2 | * | 6/2007 | Breitenbach et al. | 707/802 |
| 7,302,634 | B2 | * | 11/2007 | Lucovsky et al. | 715/200 |
| 7,343,312 | B2 | * | 3/2008 | Capek et al. | 705/7.19 |
| 7,447,608 | B1 | * | 11/2008 | Poston et al. | 702/178 |
| 2001/0014866 | A1 | * | 8/2001 | Conmy et al. | 705/9 |
| 2002/0019829 | A1 | | 2/2002 | Shapiro | |
| 2002/0032592 | A1 | * | 3/2002 | Krasnick et al. | 705/8 |
| 2002/0046076 | A1 | * | 4/2002 | Baillargeon et al. | 705/8 |

(Continued)

OTHER PUBLICATIONS

Sen, Sandip; Durfee, Edmund H., "A Formal Study of Distributed Meeting Scheduling," Group Decision and Negotiation 7: 265-289, 1998.*

(Continued)

*Primary Examiner* — Alan S Miller
(74) *Attorney, Agent, or Firm* — Steven M. Greenberg, Esq.; Carey, Rodriguez, Greenberg & O'Keefe

(57) ABSTRACT

A method, system and apparatus for scheduling subsidiary meeting locations can include sending an invitation to a selection of invitees to a meeting in a collaborative environment for at least one primary location. The method further can include processing both complete acceptances and declinations to the meeting from individual ones of the invitees for the primary location, and also partial acceptances to the meeting from a set of the invitees in the selection. In respect to the partial acceptances, an alternative location to the primary location can be determined which has not already been designated as an acceptable subsidiary location to the meeting. In response, when a number of invitees in the set of invitees exceed a threshold value, the alternative location can be designated as an acceptable subsidiary location to the meeting. Consequently, acceptances can be processed for the set of invitees.

15 Claims, 2 Drawing Sheets

(56) References Cited

U.S. PATENT DOCUMENTS

| | | | | |
|---|---|---|---|---|
| 2002/0184063 | A1* | 12/2002 | Kaufman et al. | 705/7 |
| 2003/0004773 | A1* | 1/2003 | Clark et al. | 705/8 |
| 2003/0204474 | A1* | 10/2003 | Capek et al. | 705/64 |
| 2003/0217073 | A1* | 11/2003 | Walther et al. | 707/104.1 |
| 2004/0078255 | A1* | 4/2004 | Demsky et al. | 705/8 |
| 2004/0093290 | A1* | 5/2004 | Doss et al. | 705/35 |
| 2004/0117446 | A1* | 6/2004 | Swanson | 709/205 |
| 2005/0034079 | A1* | 2/2005 | Gunasekar et al. | 715/753 |
| 2005/0058088 | A1* | 3/2005 | Decker et al. | 370/260 |
| 2005/0243165 | A1* | 11/2005 | Endler et al. | 348/14.02 |
| 2005/0273372 | A1* | 12/2005 | Bowne et al. | 705/5 |
| 2006/0095376 | A1* | 5/2006 | Mitchell et al. | 705/50 |
| 2006/0095859 | A1* | 5/2006 | Bocking et al. | 715/764 |
| 2006/0161554 | A1* | 7/2006 | Lucovsky et al. | 707/10 |
| 2009/0222519 | A1* | 9/2009 | Boyd | 709/204 |

OTHER PUBLICATIONS

Haynes, Thomas; Sen, Sandip; Arora, Neeraj; Nadella, Rajani "An automated meeting scheduling system that utilizes user preferences" Autonomous Agents 97, Marina Del Rey, California USA 1997.*

Chun, Andy; Wai, Hon; Wong, Rebecca Y.M.; "Optimizing agent-based meeting scheduling through preference estimation" Engineering Applications of Artificial Intelligence 16 (2003) 727-743.*

Glezer, Chanan "A conceptual model of an interorganizational intelligent meeting-scheduler (IIMS)" Journal of Strategic Information Systems 12 (2003) 47-70.*

Mosier, Jane N.; Tammaro, Susan G., "When Are Group Scheduling Tools Useful?," Computer Supported Cooperative Work: The Journal of Collaborative Computing 6: 53-70, 1997.*

* cited by examiner

SCHEDULING SUBSIDIARY MEETING LOCATIONS

BACKGROUND OF THE INVENTION

1. Statement of the Technical Field

The present invention relates to the field of collaborative computing and more particularly to scheduling meetings in a collaborative computing environment.

2. Description of the Related Art

Individuals worldwide can converge over a communications network to share ideas, documents, sound and images without needing to be in the same room. Technology facilitates this through multipoint audio conferencing, video conferencing over traditional networks, and many forms of conferencing over the Internet. A substantial collection of technologies and protocols has been assembled to effectively deliver audio, video, and data over the single digital communications medium of the Internet.

An e-meeting represents one popular form of electronic collaboration. In a meeting, participants can view a common space, for instance a whiteboard or a shared application (or both), through which ideas can be exchanged. The viewing of the common space can be complemented with a teleconference, a videoconference, an instant messaging session, or any combination thereof, such that the meeting can act as a near substitute for an in-person meeting in a conference room.

Collaborators who participate in meetings often maintain a personal schedule managed by a scheduling system. Collaborators can schedule meetings within the personal schedule sua sponte, or the collaborators can schedule meetings responsive to the receipt of an invitation. An invitation typically contains data regarding the meeting such as a topic, list of invitees, and most importantly, a date, time and location for the meeting. Using this data, the invitee can be prompted either to accept or decline the invitation. Oftentimes, the acceptance or declination of an invitation can be accomplished with a single user action such as a mouse click.

Generally, to initiate a technology facilitated meeting, a meeting host can transmit a meeting invitation to a mailing list of desired participants to the meeting. The invitation can be transmitted in a number of ways, including e-mail, or through the operation of a group calendaring application. In the typical circumstance, some of the invited desired participants cannot attend the meeting at a proposed primary location which has been configured to support the meeting with the necessary meeting tools, such as a video conferencing unit or audio conferencing telephone. Likewise, one or more of those same invited desired participants cannot attend the meeting at a designated alternative or subsidiary location also configured to engage in the meeting.

For an invited desired participant to the meeting to attend the meeting in those circumstances, the invited desired participant first must identify a non-designated subsidiary location configured to engage in the meeting. Once identified, the non-designated subsidiary location can be proposed to the meeting host to become designated as a subsidiary location. Yet, invited participants can request such a designation of a subsidiary location without knowing how many other invited participants also prefer the designation of the same subsidiary location. The addition of a new subsidiary location therefore, can be burdensome and can discourage optimal use of distributed meeting technology.

Under current technology and practices, the invitee who cannot attend at an established site can choose among only the following less than desirable courses of action:

(A) Opt not to attend the meeting;
(B) Attempt to persuade the meeting host to schedule a repeat occurrence of the meeting;
(C) Attend the meeting from a location having limited facilities available; or,
(D) Identify and contact other invitees and administrators to the proposed meeting to coordinate the identification of a suitably configured location and its designation as an additional subsidiary location.

SUMMARY OF THE INVENTION

The present invention addresses the deficiencies of the art in respect to scheduling a technology facilitated meeting and provides a novel and non-obvious method, system and apparatus for scheduling subsidiary meeting locations. In this regard, a method for scheduling subsidiary meeting locations in a collaborative environment can include sending an invitation to a selection of invitees to a meeting in the collaborative environment for at least one primary location. The method further can include processing both complete acceptances and declinations to the meeting from individual ones of the invitees for the primary location, and also partial acceptances to the meeting from a set of the invitees in the selection.

In respect to the partial acceptances, an alternative location to the primary location can be determined which has not already been designated as an acceptable subsidiary location to the meeting. For example, the determining step can include prompting selected invitees in the set to specify the alternative location. As another example, the determining step can include retrieving calendar entries for selected invitees in the set. A location can be deduced for each of the selected invitees at a time of the meeting from temporally proximate ones of the calendar entries. The determining step yet further can include grouping a number of invitees in geographic clusters to determine a set of invitees who are geographically proximate to one another during a specific period of time.

As such, the alternative location can be determined from the deduced location for each of the selected invitees. In response, when a number of invitees in the set of invitees exceed a threshold value, the alternative location can be designated as an acceptable subsidiary location to the meeting. Consequently, acceptances can be processed for the set of invitees. By comparison, where the number of invitees falls short of the threshold value, the invitees in the set can be notified that the request is pending and not confirmed. In either case, some invitees can be assigned weights to signify a more important or less important invitee.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for scheduling subsidiary meeting locations in a collaborative environment. In accordance with the present invention, invited participants to a meeting within a collaborative environment not only can accept or decline the invitation to the meeting, but also each of the invited participants can specify an alternative location from which the invited participant can attend the meeting. To the extent that the alternative subsidiary location had not been previously designated a subsidiary location for the meeting, the meeting host can await a threshold number, possibly a weighted number, of requests for an alternative region as a subsidiary location before designating a location in the alternative region as a subsidiary location. Once designated as a subsidiary location, associated invited participants to the meeting can be permitted to attend the meeting at the newly designated subsidiary location.

Figure 1:
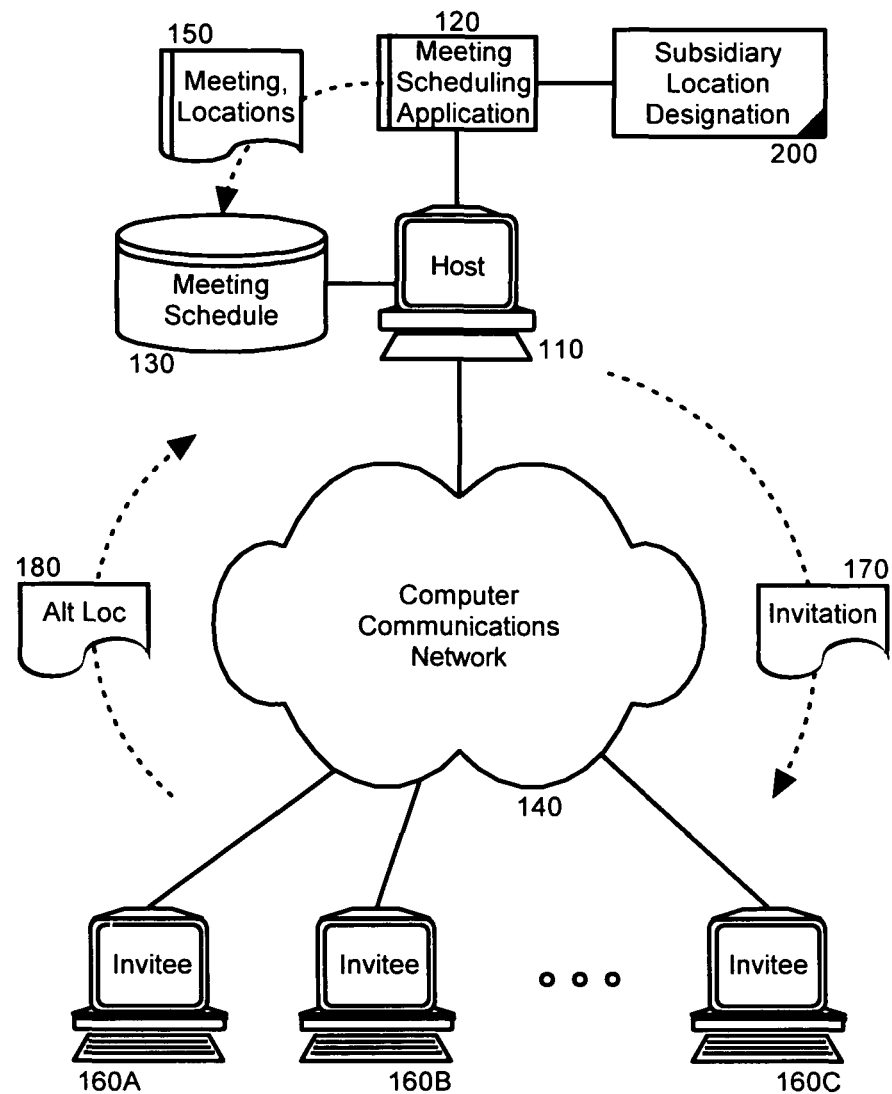
FIG. 1 is a schematic illustration of a collaborative system configured to schedule subsidiary meeting locations; and, FIG. 2 is a flow chart illustrating a process for scheduling subsidiary meeting locations in the collaborative system of FIG. 1.

In more particular illustration, FIG. 1 is a schematic illustration of a collaborative system configured to schedule subsidiary meeting locations. As shown in FIG. 1, a collaborative environment can include a meeting host 110 coupled to one or more invited participants 160A, 160B, 160C over a computer communications network 140. The meeting host 110 can include a meeting scheduling application 120 configured to schedule a meeting as between the meeting host 110 and the invited participants 160A, 160B, 160C.

The meeting application 120 can maintain a schedule of meetings 130 for the meeting host 110 which can manage one or more meetings, each meeting having an associated time, a set of invited participants, a list of accepted and declined invitations, a primary location and a listing of one or more designated subsidiary locations suitable for supporting the meeting. Specifically, a primary location can be a physical place which has been configured to host the meeting and can include sufficient supporting technologies such as video conferencing and audio conferencing units. A subsidiary location can be a different physical location which also has been configured to host the meeting and which also can include sufficient supporting technologies.

To schedule a meeting, the meeting host 110 can issue an invitation 170 to one or more invited participants 160A, 160B, 160C. The invited participants 160A, 160B, 160C can respond by accepting the invitation at the primary location or at one of the designated subsidiary locations, declining the invitation, or accepting the invitation with a request to attend the meeting at an alternative location to the primary location and the designated subsidiary locations for the meeting. In this regard, when an alternative location is desired, the requesting one of the invited participants 160A, 160B, 160C can forward the alternative location 180 to the meeting host 110.

In accordance with the present invention, subsidiary location designation processing 200 can process the alternative location 180 to determine whether or not to designate the alternative location 180 as a subsidiary location. Notably, the subsidiary location designation processing 200 can be automated, or the processing can be performed manually. In any event, the logic of the subsidiary location designation processing 200 can determine when a threshold number of requests have been received to designate the alternative location 180 as a subsidiary location, or whether a threshold number of requests have been received to designate a location within the vicinity of the alternative location 180 as a subsidiary location. Optionally, individual requests can be weighted. When a threshold number of requests have been received, the logic of the subsidiary location designation processing 200 can designate the alternative location 180 as a subsidiary location and the associated ones of the invited participants 160A, 160B, 160C can be so notified.

Figure 2:
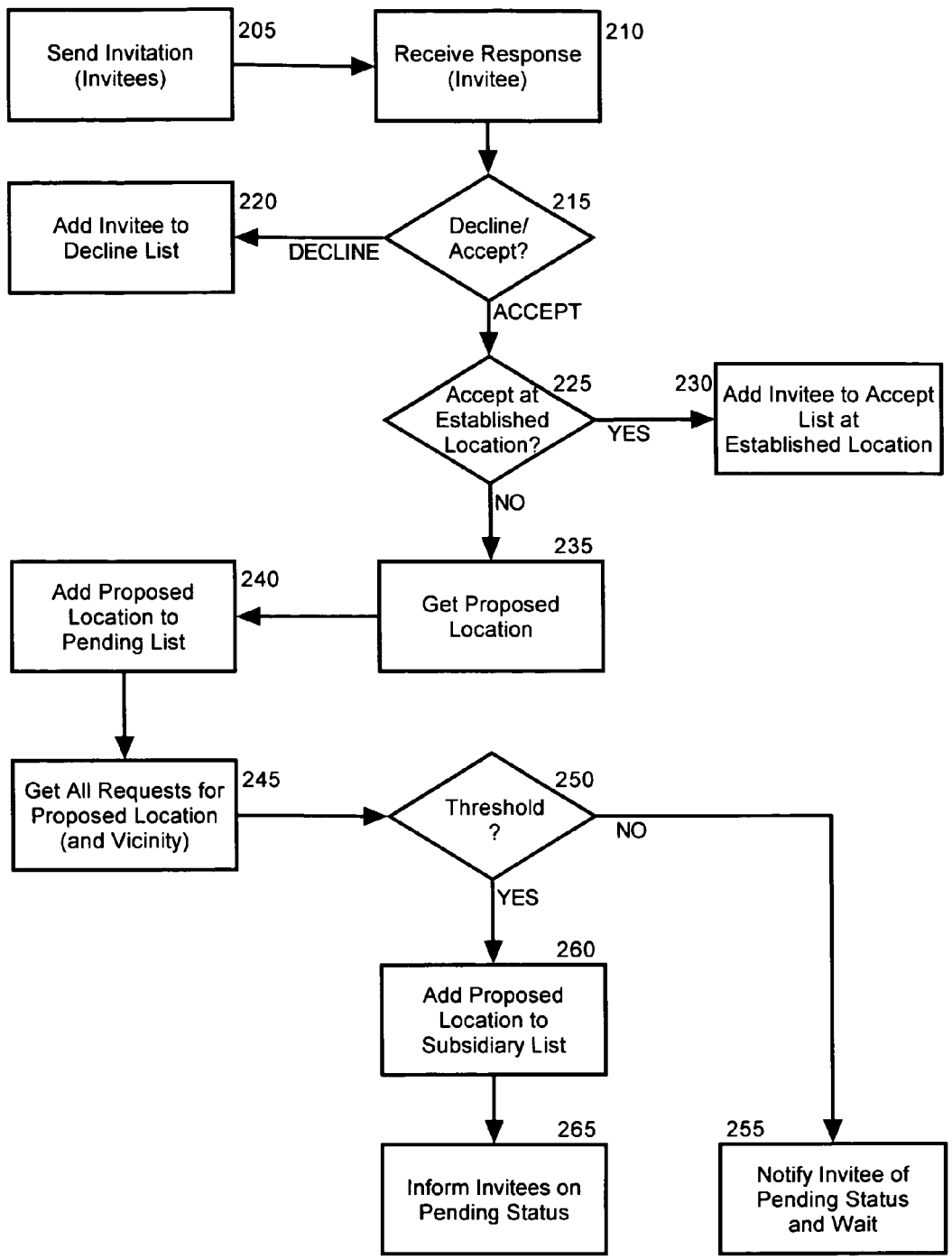

In more specific illustration of the operation of the subsidiary location designation processing 200, FIG. 2 is a flow chart illustrating a process for scheduling subsidiary meeting locations in the collaborative system of FIG. 1. Beginning in block 205, an invitation to join a meeting can be sent to one or more invitees. In block 210, a response to the invitation can be received from one of the invitees. In decision block 215 it can be determined whether the invitee has accepted the invitation, declined the invitation, or otherwise specified an alternative location at which the invitee can accept the invitation. If the invitee outright declines the invitation, in block 220 the invitee can be added the decline list for the primary location for the meeting.

In contrast, if the invitee accepts the invitation, in decision block 225 it can be determined whether the invitee has accepted the meeting invitation and will attend the meeting from an established location for the meeting, or whether the invitee has proposed an alternative location from which the invitee would prefer to attend the meeting. If the invitee has accepted the invitation and will attend the meeting from an established location, in block 230 the invitee can be added to the accept list for the meeting at an established location. Otherwise, the process can continue through block 235.

In block 235, the proposed alternative location for the meeting can be determined and in block 240 the proposed location can be added to the pending list of proposed locations. Subsequently, in block 245 all requests for the proposed location can be counted. Alternatively, all requests for proposed locations within the same geographic vicinity of the proposed location can be counted. In either case, if in decision block 250 the number of requests, possibly weighted by request, to designate the proposed location as a subsidiary location does not exceed a threshold value, in block 255 the invitee can be notified of the pending status of the request. Otherwise, when the number of requests exceeds the threshold value, in block 260 the alternative location can be designated as a subsidiary location and in block 265 the invitees associated with the alternative location can be added to the accept list for the newly designated subsidiary location. Alternatively, all invitees can be notified of the newly designated subsidiary location.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:

1. A method for scheduling subsidiary meeting locations for a meeting in a collaborative environment, the method comprising the steps of:
   sending a meeting invitation to a selection of invitees in the collaborative environment for at least one primary location;
   processing within a meeting host executing in a computer system, both complete acceptances and declinations to said meeting invitation from individual ones of said invitees for said primary location, and also partial acceptances to said meeting invitation from a set of said invitees in said selection a set of the partial acceptances requesting an alternative location that is different than the primary location;
   determining within the meeting host for said partial acceptances whether or not the alternative location has been designated as an acceptable subsidiary location or whether the alternative location has not yet been designated an acceptable subsidiary location; and,
   responsive to a threshold value being exceeded based upon a number of invitees in said set of invitees designating said alternative location that is determined to not yet have been designated an acceptable subsidiary location, designating said alternative location as an acceptable subsidiary location and processing acceptances for said set of invitees.

2. The method of claim 1, wherein said determining step comprises the steps of:
   retrieving calendar entries for selected invitees in said set;
   deducing a location for each of said selected invitees at a time specified by said meeting invitation from temporally proximate ones of said calendar entries; and,
   determining said alternative location from said deduced location for each of said selected invitees.

3. The method of claim 1, wherein said determining step comprises the step of prompting selected invitees in said set to specify said alternative location.

4. The method of claim 1, wherein said designating step comprises the steps of:
   requesting a configuration of said alternative location to support the meeting;
   responsive to a fulfillment of said requested configuration, designating said alternative location as an acceptable subsidiary location; and,
   processing acceptances for said set of invitees.

5. The method of claim 1, further comprising the steps of:
   responsive to a threshold value not being exceeded based upon a number of invitees in said set of invitees designating said alternative location, withholding designation of said alternative location as an acceptable subsidiary location until said threshold value is exceeded; and,
   forwarding a notification that said alternative location is pending approval to each of said set of said invitees.

6. The method of claim 1, wherein said alternative location is a geographic vicinity.

7. The method of claim 1, further comprising the steps of:
   weighting different invitees which have designated said alternative location; and,
   considering said weighting for each of said different invitees when determining whether said threshold value has been exceeded.

8. A system for scheduling subsidiary meeting locations in a collaborative environment, the system comprising:
   a meeting scheduling application disposed in a meeting host executing in a computing system;
   a schedule of meetings accessible by said meeting scheduling application having primary locations and designated subsidiary locations; and,
   subsidiary location designation logic coupled to said meeting scheduling application, executing in the computing system and programmed to determine, for partial acceptances to an invitation to a meeting, an alternative location to a primary location for said meeting specified by several of the partial acceptances which has not already been designated as a subsidiary location to said meeting; and,
   responsive to a threshold value being exceeded based upon a number of invitees associated with said partial acceptances that have specified the alternative location, designating said alternative location as an acceptable subsidiary location to said meeting and processing acceptances for said invitees.

9. A machine readable hardware storage device having stored thereon a computer program for scheduling subsidiary meeting locations for a meeting in a collaborative environment, the computer program comprising a routine set of instructions which when executed by the machine causes the machine to perform the steps of:
   sending a meeting invitation to a selection of invitees in the collaborative environment for at least one primary location;
   processing both complete acceptances and declinations to said meeting invitation from individual ones of said invitees for said primary location, and also partial acceptances to said meeting invitation from a set of said invitees in said selection a set of the partial acceptances requesting an alternative location that is different than the primary location;
   determining within the meeting host for said partial acceptances whether or not the alternative location has been designated as an acceptable subsidiary location or whether the alternative location has not yet been designated an acceptable subsidiary location; and,
   responsive to a threshold value being exceeded based upon a number of invitees in said set of invitees designating said alternative location that is determined to not yet have been designated an acceptable subsidiary location, designating said alternative location as an acceptable subsidiary location and processing acceptances for said set of invitees.

10. The machine readable hardware storage device of claim 9, wherein said determining step comprises the steps of:
    retrieving calendar entries for selected invitees in said set;
    deducing a location for each of said selected invitees at a time specified by said meeting invitation from temporally proximate ones of said calendar entries; and,
    determining said alternative location from said deduced location for each of said selected invitees.

11. The machine readable hardware storage device of claim 9, wherein said determining step comprises the step of prompting selected invitees in said set to specify said alternative location.

12. The machine readable hardware storage device of claim 9, wherein said designating step comprises the steps of:
- requesting a configuration of said alternative location to support the meeting;
- responsive to a fulfillment of said requested configuration, designating said alternative location as an acceptable subsidiary location; and,
- processing acceptances for said set of invitees.

13. The machine readable hardware storage device of claim 9, further comprising the steps of:
- responsive to threshold value not being exceeded based upon a number of invitees in said set of invitees designating said alternative location, withholding designation of said alternative location as an acceptable subsidiary location until said threshold value is exceeded; and,
- forwarding a notification that said alternative location is pending approval to each of said set of said invitees.

14. The machine readable hardware storage device of claim 9, wherein said alternative location is a geographic vicinity.

15. The machine readable hardware storage device of claim 9, further comprising an additional set of instructions which when executed by the machine causes the machine to further perform the steps of:
- weighting different invitees which have designated said alternative location; and,
- considering said weighting for each of said different invitees when determining whether said threshold value has been exceeded.

* * * * *